March 24, 1970     F. W. DITTMAN     3,502,216
ROTARY FILTER APPARATUS
Filed Jan. 12, 1968
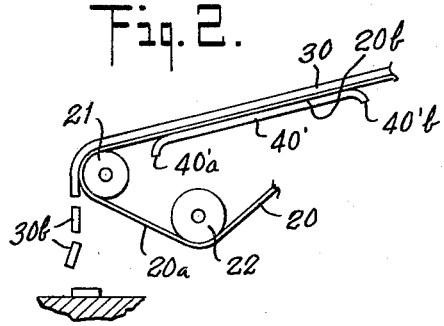
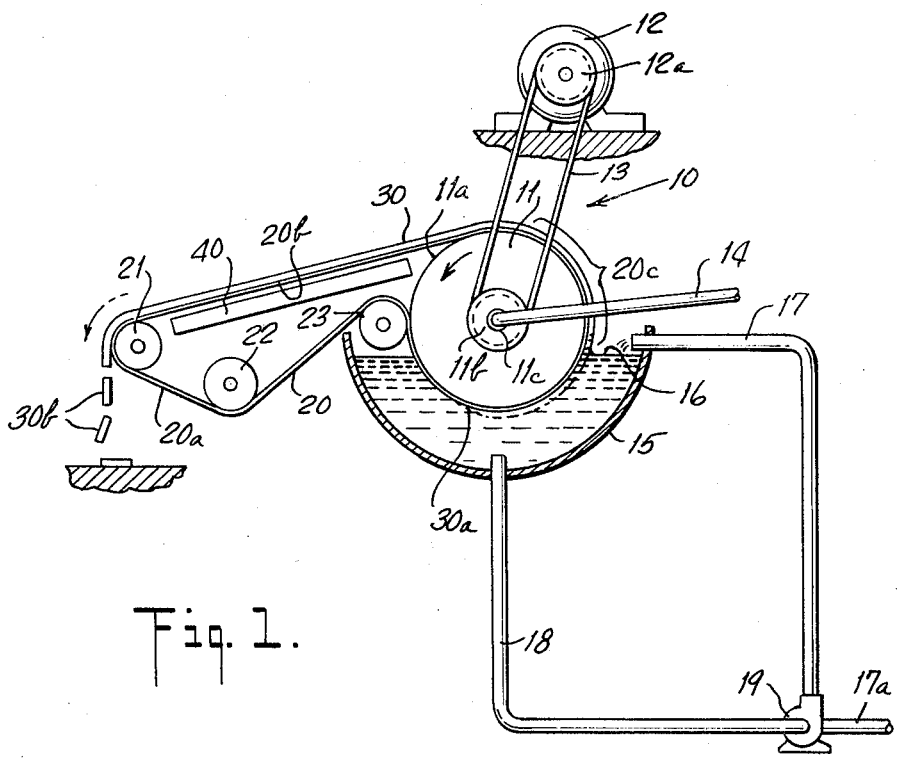
INVENTOR.
FRANK W. DITTMAN
BY
ATTORNEY United States Patent Office 3,502,216
Patented Mar. 24, 1970

3,502,216
ROTARY FILTER APPARATUS
Frank W. Dittman, Bridgewater Township, Somerset County, N.J., assignor to Research Corporation, New York, N.Y., a non-profit corporation of New York
Filed Jan. 12, 1968, Ser. No. 697,352
Int. Cl. B01d 35/18
U.S. Cl. 210—179    1 Claim

ABSTRACT OF THE DISCLOSURE

A rotary filter of the type wherein an endless filter cloth is carried upon a continuously rotating porous or perforated drum partially immersed in a mother liquor, a vacuum being applied at the interior of the drum to cause filtrate from the mother liquor to enter the drum through the intervening filter cloth, leaving behind a filter cake, and a portion of the endless filter cloth being located remote from the drum for discharge of the filtered cake, further characterized by the improvement including heating means located between the drum and the filter cake discharge point adapted to heat the underside of the filter cloth remote from the filter cake on the overside thereof, sufficient to substantially dry the filter cloth without substantially drying the filter cake, so that an improved comprise between thinness of the filter cake and ability of the filter cake to separate from the filter cloth is achieved, thereby allowing higher filtration rates per unit of filter cloth area without resultant deleterious adherence of the filter cake to the filter cloth at the point of discharge of the filter cake.

Background of the invention

Rotary filters are known of the type wherein a vacuum is applied to a drum partially immersed in a slurry bath, the said drum carrying an endless cloth filter member so that filter cake is built up on the filter cloth continually as the filter cloth passes through the slurry bath, with a portion of the endless filter cloth located remote from the drum so that the filter cake carried thereby may be continually discharged from the filter cloth for a collection.

It is also known that the average rate of flow through the filter cloth varies inversely with filter cake thickness, and accordingly that a thin filter cake with higher drum speeds is theoretically desirable for increased filtration rate of a given slurry per unit of filter area. However, as is notorious in all industries in which rotary filters are employed to separate filter cake from a slurry, a point is reached when the thinness of the wet filter cake prevents its discharge from the endless cloth at the discharge point, despite agitation or vibration of the cloth at that point. The adhesive force between the cake and the cloth, due to residual filtrate, is greater than gravity and the other separatory forces applied.

Inevitably then, rotary filters of the type described are employed at less than a theoretically optimum efficiency in order that the filter cake is thick enough to be continuously removed by the influence of gravity and vibration in the aforesaid manner. That is, filter cake appreciably thicker than that which would give a more desirable filtration rate is tolerated in order to prevent the worse problem of sticking of the filter cake to the filter cloth at the discharge point.

Mechanical scrapers and the like are highly undesirable, since again, the filter cloth is necessarily fragile if filtering efficiency is to be enhanced, and will not tolerate on a continuous basis any form of mechanical scraping or removal involving abrasion or touching of the filter cloth itself.

It has been known in the prior art to employ heating means for various purposes with respect to the filter cloth of a rotary filter. Thus, the Goard Patent 3,091,335, issued May 28, 1963 employs a heating means 46 to melt the crystals of the filter cake carried on the upper surface of the filter cloth 27, so that the molten crystals are discharged as a melt at the usual discharge point remote from the drum. This method obviously is limited to applications wherein the filter cake has a melting temperature below the maximum temperature which the cloth will withstand, a condition seldom found in process filtration.

The art has, however, never before recognized the employment of heating means in the manner and for the purpose employed in the present invention, i.e. to heat the underside of the filter cloth between the drum and the filter cake discharge point to dry the cloth without appreciably drying the cake itself, thereby breaking the adhesion between the cloth and the cake to allow efficient separation of the two despite thinner filter cake, and to thereby increase the filtration rate with, for the first time, avoidance of filter cake adherence to the cloth at the point of discharge thereof.

Summary of the invention

In a rotary filter of the type wherein an endless filter cloth is carried upon a continuously rotating perforated or porous drum partially immersed in a mother liquor, a vacuum being applied at the interior of the drum to cause filtrate from the mother liquor to enter the drum through the intervening filter cloth leaving behind a filter cake, and a portion of the endless filter cloth being located remote from the drum for discharge of the filtered cake, the improvement in combination therewith, comprising heating means located between the drum and the filter cake discharge point adapted to heat the underside of the filter cloth remote from the filter cake on the overside thereof, sufficient to substantially dry the cloth without substantially drying the filter cake, so that an improved comprise between thinness of the filter cake and ability of the filter cake to separate from the filter cloth under the influence of gravity and aided or not by mechanical agitation is achieved, thereby allowing improved filtration rates without resultant deleterious adherence of the filter cake to the filter cloth at the point of discharge of the filter cake.

Brief description of the figures

FIG. 1 shows a schematic representation of a rotary filter employing an endless cloth as a filter member, with a filter cake discharge point of the endless filter cloth located remote from the continuously rotating porous or perforated drum, and employing a first embodiment of heating means according to the invention; and FIG. 2 shows a schematic view of a portion of the apparatus shown in FIG. 1, but employing a second embodiment of heating means according to the invention.

Detailed description of the figures

Referring now to the drawing, and initially to FIG. 1 thereof, a rotary filter indicated generally at 10 comprises, in accordance with prior art teachings, a continuously rotatable drum 11 having a cylindrical outline with the cylindrical surface 11a thereof being perforate with a multiplicity of fine apertures about its entire periphery. The drum 11 is rotated in a counter-clockwise direction (as indicated by the curved arrow thereon) by a motor 12 connected in driving relation to drum 11 by pulleys 12a, 11b respectively on motor 12 and drum 11, and belt 13. The particular drive means and arrangement shown is merely illustrative, e.g. a variable speed transmission may be used instead. The pulley 11b forms a part of drum hub 11c, through which a conduit 14 passes into the interior of the drum, to withdraw filtrate drawn into the drum through perforate surface 11a, and to apply the vacuum necessary to motivate the filtration.

The prior art further teaches that drum 11 is immersed partially in pan 15, which is filled to level 16 with slurry containing the filterable material carried in a mother liquor. A feed conduit 17 supplied the slurry to pan 15. To keep the solids concentration of the slurry in the pan 15 relatively uniform, it is known and preferred to recirculate the pan contents continuously mixed with fresh slurry. One means of doing this is shown in FIG. 1 where fresh slurry from supply conduit 17a is mixed at pump 19 with recirculated slurry drawn from pan 15 through conduit 18, and the mixture is pumped into pan 15 from feed conduit 17. A mixing device may also be used (not shown) within pan 15 to help maintain solids concentration uniformity. It is also known to include an endless cloth filter belt 20, carried around surface 11a of drum 11 to an idler 21 constituting, at its tangential portion applied to belt 21, the aforesaid remote filter cake discharge point taught by the prior art. Additional idlers 22, 23 return belt 20 to the surface 11a of drum 11.

The prior art construction operates by building filter cake 30 upon belt 20 while the latter is immersed on drum 11 beneath surface 16 of the slurry in pan 15. A thin, progressively thicker film 30a of filter cake is shown diagrammatically building-up on belt 20 beneath surface 16. When belt 20 emerges from pan 15, the full thickness of filter cake 30 will have been attained, in response to the consituency of the slurry, the vacuum applied at conduit 14, and the speed of the surface 11a, among other factors. Ideally, the cake 30 is gravity-discharged at idler 21 as fragments 30b, and the portion of belt 20 labeled 20a is returned clean to drum 11.

As has already been mentioned, a thin cake 30 means a greater filtration rate with a given slurry, e.g. a thinner cake with higher drum speeds gives a higher filtrate rate per unit time. Also, thin cake often filters sufficiently faster than thick cake to yield a higher cake rate per unit time. The ability to filter a dilute slurry (which characteristically yields a very thin filter cake) is economically important because, it gives the designer the freedom to select the optimum combination of clarifier and filter. Yet the optimum thinness has not heretofore been attainable because, with cake thinner than ¼" to ½", the cake has heretofore always adhered sufficiently to the cloth 20 to prevent gravity discharge (even with agitation) at idler 21. The art accordingly has accepted appreciably less than optimum yield rate in order to avoid failure to discharge the cake 30 from the belt 20, at enormous industry-wide cost. As aforesaid, mechanical scrapers and the like (not shown) present more problems than they solve, because the cloth of belt 20 must necessarily be fragile, if its filtration resistance is to be low.

Applicant has now improved the basic rotary filter shown in FIG. 1 by the simple expedient of adding a single element, and yet the addition of this element allows thinner cake 30 than heretofore, with an increase in flexibility and filtration yield rate that alone will revolutionize such filtration in many industries. Moreover, the addition of this element allows easy filtration of slurries that heretofore were considered uneconomical or impossible to filter.

The improvement comprises the addition to the rotary filter 10 of a heating element underneath belt 20, at portion 20b thereof, i.e. at the portion of belt 20 passing from drum 11 to idler 21. In the embodiment of FIG. 1, a radiant heating element 40 is shown, while in the embodiment of FIG. 2, a surface contact heating element 40' is shown. The filter cake 30 is carried across the heating element, and the simple but vital dual insight of applicant is that first, the belt 20 must be dried at that point in order to break the adhesion so as to allow a thin cake to discharge under gravity at idler 21, but second, that heating from above or ambient heating will not break the adhesion because there is too much liquid remaining in cake 30 for drying of the cake and belt together to be feasible or economical. Applicant has found that heat applied directly to the underside of belt 20, at portion 20b, will substantially dry the belt before additional moisture can migrate from the overlying cake 30, thereby breaking the adhesive bond therebetween without decreasing the belt speed, to effect drying. In other words, the use of radiant heat element 40 or a contact heat element 40' at the indicated position, is fully consistent with otherwise desirable rotary filter process parameters. Thinner cake 30 can then, for the first time, be practiced at higher belt speeds, thereby increasing yield rates and opening new filter opportunities, as aforesaid.

The radiant heating element 40 of FIG. 1 can be any of various radiant heating sources, e.g. gas heaters, infrared lamps, incandescent lamps, resistance wire heaters, steam heated sole plates, and the like. In general, electric radiant heaters are preferred, e.g. resistance wire heaters or infra-red lamps, because the intensity of radiant heat is more time invariant and more easily and repeatedly variable. Relatively little moisture is carried in the cloth belt 20 itself, and the quantity of moisture generally represents less than 10% of the quantity of moisture carried in a typical filter cake layer 30. Application of radiant heat to the layer of filter cake 30 from above the belt 20 clearly cannot dry the belt 20, and thereby break the adhesion bond, until all of the layer of cake 30 is dried. Accordingly, prior art references such as that to Goard 3,091,335 discussed above, which direct radiant heat at the filter cake itself, do not have anything to do with applicant's invention, because in addition to teaching the use of radiant heat for entirely different purposes than applicants, the heat is directed in such a way as to be ineffective for applicant's purpose in any event. On the other hand, when the radiant heat is directed as taught by applicant from the source 40 directly against the underside of belt 20, the belt is rapidly dried faster than moisture can migrate from the cake 30 to the belt 20, and the adhesion bond is sufficiently weakened if not broken, in order to enable discharge at idler 21 as illustrated.

The surface contact heating element 40' of FIG. 2 comprises a flat, polished plate, preferably aluminum or other good conducting metal. The hot plate 40' contacts the entire width of belt portion 20b along an appreciable span thereof. Such a hot plate introduces negligible friction and wear, and the forward and rear edges 40'a and 40'b are curved away from belt portion 20b to further ensure this. Plate 40' can be heated by circulated fluids or gases, or by combustion or electric heaters. The latter is preferred. Contact heating element 40' is more efficient than radiant heating element 40 in drying belt portion 20b, because heat transfer is principally to the water in belt portion 20b directly. With radiant heating element 40, a large portion of the heat is first absorbed by the belt portion 20b, and then transferred to the water therein.

The following examples will illustrate the practice of the invention and the criticality of employment of the improvement represented by radiant heat element 40 or contact heat element 40' in obtaining the results of the invention. The rotary filter apparatus employed in these examples is Model KS-3X1, manufactured by Komline-Sanderson Corp. This rotary filter employs a rotary drum 3 feet in diameter by 1 foot wide, having a total filtration area of 9.4 square feet. The filter is of the type in which endless cloth belt 20 consists of heat-resistant cloth of approximately 400 mesh, and wherein a cloth-rippling device (not shown) is applied at the point of cake discharge (idler 21) in accordance with the prior art. The rotary filter 10 is equipped with vacuum tanks, a filtrate pump, a mechanical vacuum pump, slurry tanks with mechanical mixers, and a filter pan mixer, all not shown.

Instrumentation included a vacuum gage in the filtering vacuum tank measuring the vacuum applied at conduit 14, a vacuum gage in a cake-drying vacuum tank measuring ambient vacuum applied at cake 30 upon belt 20 during stretch 20c thereof, a flowmeter for indicating filtrate rate through conduit 14, and variable speed controls and indicators on the motor 12. The radiant heat element 40 employed in Examples I and II was a 1500 watt flat electric heater (110 volt single phase) located within ½ to 3 inches of the underside of belt portion 20b. The contact heat element 40' employed in Example III was an aluminum plate having a 1500 watt series of strip heaters attached to the lower surface thereof. Plate 40' was 0.19 inch thick. Both heating means 40 and 40' were controlled by means of a variable transformer (not shown) with output of zero to 140 volts, zero to 1.5 kva.

EXAMPLE I

The rotary filter 10 was charged with slurry comprising 1.2% (wt.) calcium carbonate (average particle size 200 mesh) in water until level 16 was attained, and then the motor 12 was energized to drive drum 11 in the indicated direction at a speed of 0.08 r.p.m., and a filter vacuum at conduit 14 of 13.5 inches Hg was applied, and a cake-drying vacuum at belt portion 20b of 4.0 inches Hg was applied. The radiant heating element 40 was employed as illustrated in FIG. 1. The variable transformer was set at 95% of maximum voltage, i.e. at 133 volts. A filter cake 30 measuring approximately $\frac{1}{16}$ inch in thickness was built upon belt 20 and carried across portion 20b where the underside of the belt was dried in accordance with the invention. Maintenance of these conditions with a $\frac{1}{16}$ inch cake produced a filtrate rate at conduit 14 of 3.63 g.p.m., or 21.8 g.p.h./ft.$^2$. When the cake 30 reached idler 21, under the aforesaid belt rippler action together with gravity, the cake 30 broke into parts 30b which were discharged for collection, and the returning belt portion 20a was found to be 100% free of cake 30. Samples of cake 30 were taken before they reached the zone of radiant heater 40 and were found to comprise 44.3% water, while samples immediately retrieved from portions 30b were found to comprise 30.2% water, indicating only partial drying of cake 30 by the process of the invention. The collected cake portions 30b were produced at a rate of 12.2 lbs. per hour in the partially dried condition, which corresponds to approximately 18 lbs. per hour on an undried basis.

EXAMPLE II

The procedures of Example I were repeated, and the drum speed of 0.08 r.p.m. again produced a cake thickness of approximately $\frac{1}{16}$ inch. However, in this instance the variable transformer was set at 0%, so that the heater 40 produced no radiant heat. Under these conditions, the cake 30 produced, which was identical in thickness and composition to the cake 30 produced in the first example, did not fall of its own weight, with cloth-rippling, at idler 21. Rather, the $\frac{1}{16}$ inch cake produced without employment of radiant heat at heater 40 clung to the belt 20 completely, so that a 0% discharge rate occurred at idler 21. The return of cake 30 to the drum 11 without discharge at idler 21 quickly increased the thickness of layer 30 by application of new layers upon recycling. The high filtration rate attained and maintained in Example I because of the dual factors of employment of a $\frac{1}{16}$ inch cake 30 and a 100% removal thereof at idler 21, rapidly diminished in the present instance when the cake 30 was 100% returned to the drum 11, to a filtrate rate of 0.95 g.p.m. or 6.1 g.p.h/ft.$^2$, or less than one-third that attained and maintained in the inventive procedure outlined in Example I. This present example illustrates the criticality of employing radiant heating means 40 to enable production of a cake 30 too thin to fall at idler 21 under its own weight, with the advantages attendant such a thin cake, such as low solids concentration in the slurry and increased filtrate rate.

EXAMPLE III

The rotary filter was charged with slurry comprising 6.0% (wt.) calcium carbonate (average particle size 200 mesh) in water until level 16 was attained, and then the motor 12 was energized to drive drum 11 in the indicated direction at a speed of 0.242 r.p.m., and a filter vacuum at conduit 14 of 10.0 inches Hg was applied, and a cake drying vacuum at belt portion 20b of 10.0 inches Hg was applied. The contact heating element 40' was employed as illustrated in FIG. 2. The variable transformer was set at 90% of maximum voltage, i.e. at 126 volts. A filter cake 30 measuring approximately $\frac{5}{64}$ inch in thickness was built upon belt 20 and carried across portion 20b where the underside of the belt was dried in accordance with the invention. Maintenance of these conditions with a $\frac{5}{64}$ inch cake produced a filtrate rate at conduit 14 of 3.5 g.p.m., or 22.3 g.p.h./Ft.$^2$. When the cake 30 reached idler 21, under the aforesaid belt rippler action together with gravity, the cake 30 broke into parts 30b which were discharged for collection, and the returning belt portion 20a was found to be more than 90% free of cake 30. Samples of cake 30 were taken before they reached the zone of contact heater 40' and were found to comprise 45.0% water, while samples immediately retrieved from portions 30b were found to comprise 34.5% water, indicating only partial drying of cake 30 by the process of the invention. The collected cake portions 30b were produced at a rate of 84.4 lbs. per hour in the partially dried condition, which corresponds to approximately 110 lbs. per hour on an undried basis. This present example illustrates that the better heat transfer available with the contact heating element 40' rather than the radiant heating element 40, allows use of greater drum speeds to produce over five times the yield rate of filter cake at approximately the same thin thickness of filter cake on belt 20, and with as high a filtrate rate and nearly as low a solids concentration.

What has been described and illustrated is an apparatus allowing production of a thin filter cake, with efficient discharge thereof, so that the advantages of process variables resulting in such a thin cake can be obtained. These advantages include a lower solids concentration in the slurry and higher filtrate rate, both of which result in more economical equipment and a more economical process. Such economy results from the greater simplicity of filtration, e.g. the lack of necessity for complicating filter aids such as diatomaceous earth, that is possible when conditions leading to a thin cake can be practiced.

The invention has been described with reference to two preferred, but merely illustrative embodiments, and in accordance with typical but merely illustrative examples of the procedure. Those skilled in the art will readily recognize that numerous changes and variations from this illustrative showing can be practiced without departing from the spirit and scope of the invention itself.

What is claimed is:

1. A rotary vacuum filter for separating solids as a filter cake and liquid as a filtrate from a liquid-solids slurry including means for holding a body of said slurry, a filter drum adapted for rotation within said slurry holding means and positioned therein so that a portion of the periphery of said drum is immersed in said slurry within said holding means, means for recirculating slurry from said body of slurry back into said body of slurry together with fresh slurry, means for applying a vacuum to the interior of said drum and for removing said filtrate therefrom, a roller located spaced from said drum to define a filter cake discharge location, a continuous filter belt adapted to be carried on and to travel on said drum and said roller, said filter belt having a cake-carrying portion spanning the distance between said drum and said roller and a filter cake-building portion on that portion of said belt carried on said drum within said slurry-holding means and in contact with the slurry therein, means for rotating said drum at a speed within said slurry-holding means for forming a relatively thin filter cake on said cake-building portion of said filter belt, said filter cake being carried on the upper side of said filter belt as said filter belt moves from said drum to said roller, heat transfer means comprising a heatable plate provided with a polished surface positioned beneath said filter belt along the cake-carrying portion thereof such that the polished surface of said plate is in contact with the underside of said belt, said heatable plate being substantially coextensive with the width and length of said belt along the cake-carrying portion thereof and being provided with curvilinear leading and trailing ends, the polished surface of said plate serving to provide substantially friction-free and wear-free travel of said belt as it moves over and in contact with said plate and said plate being adapted to heat said belt as said belt moves over and in contact with said plate to dry said belt to weaken the adhesion of the filter cake thereto as it moves from said drum to said roller such that when said filter cake reaches said filter cake discharge location the filter cake is discharged from said belt as said belt and said filter cake pass over said roller.

References Cited

UNITED STATES PATENTS

| | | | |
|---|---|---|---|
| 583,361 | 5/1897 | Droeshout | 210—179 |
| 2,960,233 | 11/1960 | Schepman | 210—401 X |
| 3,091,335 | 5/1963 | Goard | 210—179 |
| 3,289,848 | 12/1966 | Miles | 210—401 X |

SAMIH N. ZAHARNA, Primary Examiner

U.S. Cl. X.R.

210—186, 197, 401